Jan. 5, 1971 K. K. GAURI 3,553,192
SUBSTITUTED(2'-DEOXYRIBOSYL) URACIL COMPOUNDS, COMPOSITIONS CONTAINING SAME AND PROCESS OF MAKING AND USING SAME
Filed July 15, 1968
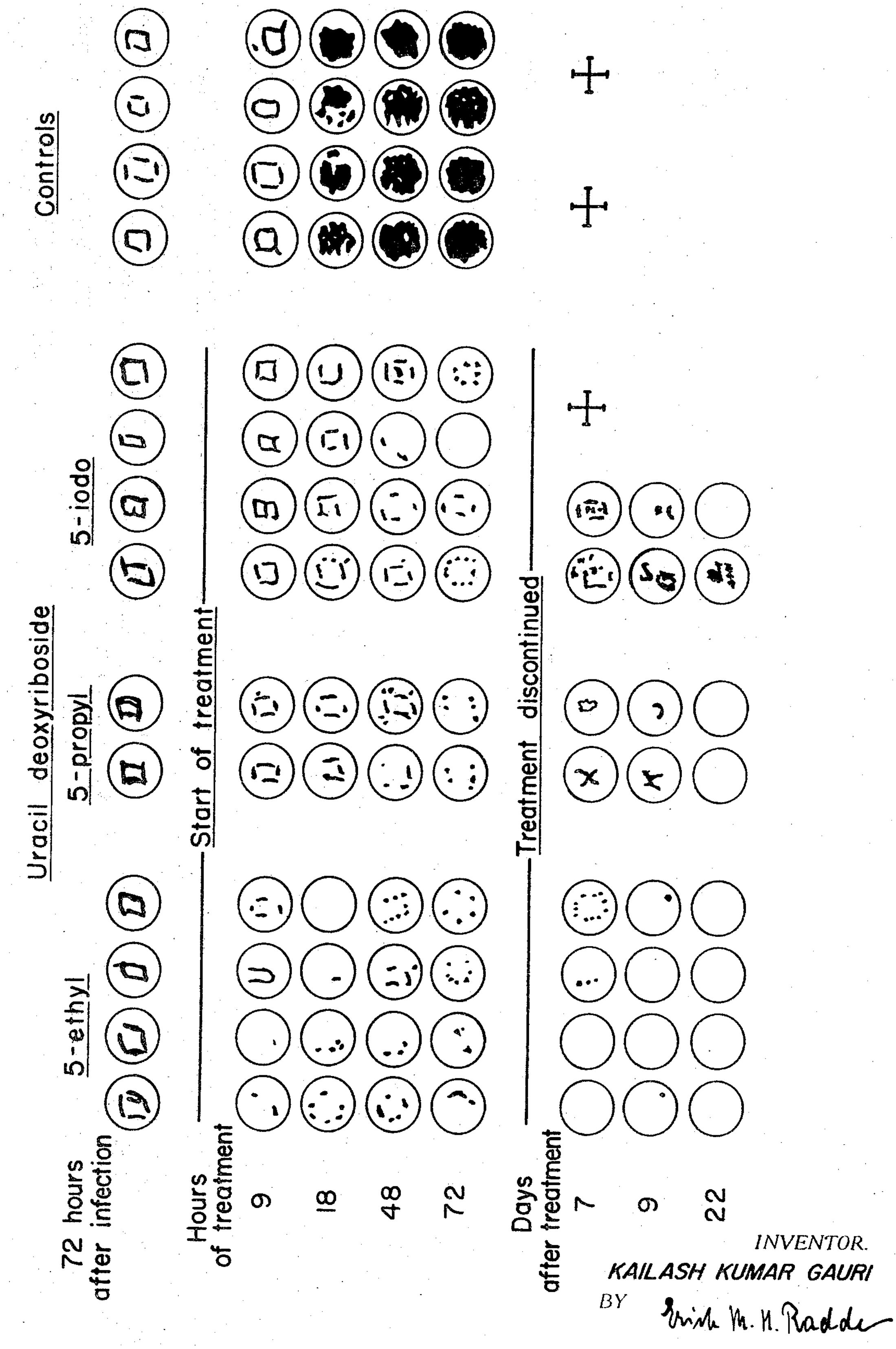
INVENTOR.
KAILASH KUMAR GAURI
BY Erich M. H. Radde
Agent

United States Patent Office 3,553,192
Patented Jan. 5, 1971

3,553,192

SUBSTITUTED (2'-DEOXYRIBOSYL) URACIL COMPOUNDS, COMPOSITIONS CONTAINING SAME AND PROCESS OF MAKING AND USING SAME

Kailash Kumar Gauri, Lentfohrden, Holstein, Germany, assignor to Robugen G.m.b.H., Esslingen (Neckar), Germany, a company of Germany Filed July 15, 1968, Ser. No. 744,957
Int. Cl. C07d *51/52*
U.S. Cl. 260—211.5 9 Claims

ABSTRACT OF THE DISCLOSURE 5-alkyl substituted and 1,5-di-alkyl substituted 3-(2'-deoxyribosyl) uracil compounds wherein the alkyl in 5-position has 2 to 6 carbon atoms and the alkyl in 1-position has 1 to 3 carbon atoms have a surprisingly high virostatic activity. Especially valuable compounds are 5-ethyl-3-(2'-deoxyribosyl) uracil and 5-n-propyl-3-(2'-deoxyribosyl) uracil.

The compounds are used in the treatment of virus diseases and have proved of considerable value in the treatment of herpes infections by topical administration, for instance, in the form of solutions, ointments, powders, sprays, plasters, and others.

The virostatic agents are prepared, for instance, by reacting a reactive derivative of 5-alkyl or 1,5-dialkyl uracil, such as its mercury salt or its trimethyl silyl compound, with a reactive derivative of 2-deoxyribose, such as the 2-deoxyribofuranosyl chloride in which the hydroxyl groups are protected by conversion into the acyloxy groups, such as the p-chloro benzoyl groups. The acyl groups are split off from the reaction products, for instance, by means of methanolic alkali metal methanolate or methanolic ammonia.

The β-anomer is the effective agent of the resulting mixture of β- and α-nucleosides.

BACKGROUND OF THE INVENTION

The present invention relates to new uracil compounds and more particularly to (2'-deoxyribosyl) uracil compounds, to pharmaceutical compositions containing such (2'-deoxyribosyl) uracil compounds, to a process of making them, and to the use of such compounds and compositions in therapy.

5-alkyl uracil compounds are known. They are homologues of thymine, i.e. 5-methyl uracil. These known 5-alkyl uracil compounds do not exhibit any virostatic activity as has been shown by M. Muraoka, A. Takada, and T. Ueda in "Keio J. Med.," vol. 11, page 95 (1962); abstracted in "Chem. Abstr.," vol. 57, page 17192b (1962).

Investigations have shown that 1,5-disubstituted uracil compounds have also no virostatic activity.

SUMMARY OF THE INVENTION

The present invention now has for its object to provide new and valuable 5-mono- and 1,5-di-substituted uracil compounds which have a surprisingly high virostatic activity.

Another object of the present invention is to provide a simple and effective process of producing such 5-mono- and 1,5-di-substituted uracil compounds of high virostatic activity.

A further object of the present invention is to provide valuable and highly effective virostatic compositions containing, as active virostatic agent, such 5-mono- or 1,5-di-substituted uracil compounds.

Still another object of the present invention is to provide a method of treating virus infections by administering such 5-mono- or 1,5-disubstituted uracil compounds to humans and warm-blooded animals.

Other objects of the present invention and advantageous features thereof will become apparent as the description proceeds.

In principle the present invention is concerned with valuable 5-monosubstituted or 1,5-disubstituted uracil compounds which carry in 3-position a deoxyribosyl group. Such compounds correspond to the following formula:

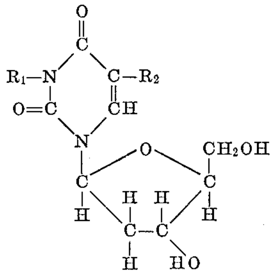

In said formula:

$R_1$ indicates hydrogen or lower alkyl with 1 to 3 carbon atoms and $R_2$ indicates alkyl with 2 to 6 carbon atoms, preferably with 2 to 3 carbon atoms.

Alkyl in said formula may be straight chain or branched alkyl and $R_1$ and $R_2$ may represent the same or different alkyl hydrocarbon radicals.

It is quite surprising and could not be expected that introduction of a deoxyribosyl group into 3-position of the uracil molecule will convert virostatically inactive compounds into highly effective compounds.

The 3(2'-deoxyribosyl) uracil compounds according to the present invention which may also be designated as deoxyribofuranoyl uracil compounds or as deoxyuridine compounds, are preferably prepared by reacting 5-monosubstituted or 1,5-disubstituted uracil compounds or their reactive derivatives, for instance, their trimethyl silyl compounds with reactive deoxyribose compounds, preferably with reactive deoxyribose compounds in which the hydroxyl groups are protected. Such reactants are, for instance, halogeno deoxyribose compounds, the hydroxyl groups of which are protected by conversion into acyloxy groups, such as acetoxy, benzoyloxy, p-toluoyloxy, anisoyloxy, p-nitro benzoyloxy, and other acyloxy groups and preferably into p-chloro benzoyloxy groups.

The mercury salts of the 5-monosubstituted uracil compounds may also be used as the one reactant. The mercury salts correspond to the following formula:

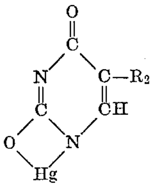

The resulting reaction product is a mixture of the α-anomer and the β-anomer. These two isomers can be separated from each other to a large extent by recrystallization from organic solvents. Suitable solvents are, for instance, toluene and ether. Best results are achieved on recrystallization from glacial acetic acid or methanol whereby the melting point of the resulting anomers can be increased by 3° C. to 5° C.

The protected hydroxyl groups are finally reconverted into the free hydroxyl groups, for instance, by selective cleavage by means of an alkali metal alcoholate, preferably sodium methanolate, or by means of alcoholic ammonia, preferably methanolic ammonia.

Of the two isomers, only the $\beta$-anomer is virostatically active. However, since the inactive $\alpha$-anomer, when present in the pharmaceutical composition together with the $\beta$-anomer, does not disadvantageously affect the virostatic activity of the $\beta$-anomer and also does not cause any undesired side-effects, it is not necessary to separate the two isomers from each other before use.

It may be mentioned that reaction of the mercury salt of the starting uracil compound with the reactive deoxyribose compound requires a molecular proportion of the former compound to be latter one of about 1:2; reaction of the trimethyl silylated uracil compound with the reactive deoxyribose compound can be carried out with a molecular proportion of the former compound to the latter one of about 1:1. Thus this last mentioned process has the advantage of a considerable saving in the deoxyribose compound and thus permits inexpensive preparation of the desired (2-deoxyribosyl) uracil compound.

BRIEF DESCRIPTION OF THE DRAWING

The attached drawing serves to illustrate the virostatic activity of 5-ethyl deoxyuridine and of 5-propyl deoxyuridine, i.e. of 5-ethyl-3-(2′-deoxyribosyl) uracil and 5-propyl-3-(2′-deoxyribosyl) uracil in comparison with controls as well as with the known 5-iodo deoxyuridine, i.e. 5-iodo-3-(2′-deoxyribosyl) uracil. The circles indicate schematic drawings of the corneal-sclearatic borders of the eyes of rabbits in which the observed lesions caused by infection with herpes simplex keratitis are depicted. A more detailed description of the drawing follows hereinafter in connection with the description of the utility of the compounds according to the present invention.

DESCRIPTION OF THE PREFERRED EMBODIMENTS

The following examples serve to illustrate the present invention without, however, limiting the same thereto.

EXAMPLE 1

3.53 g. of mercury 5-propyl uracil (0.01 mole) and 8.6 g. of di-p-chloro benzoyl deoxyribofuranosyl chloride (0.02 mole) are slowly and gradually heated to reflux temperature in 150 cc. of anhydrous toluene while stirring. Thereby, a clear solution is produced. The toluene is then distilled off, the residue is taken up in 100 cc. of chloroform, and the solution is shaken with 30% aqueous sodium iodide solution to remove the mercury ions. Petroleum ether of a boiling point between 50° C. and 70° C. is added to the separated organic layer and the crystallized reaction product is filtered off.

Thereafter, the reaction product is boiled under reflux with a 2% sodium methanolate solution in absolute methanol for two hours to cause splitting off of the acyl group. The methanol is distilled off the deacylation mixture and the residue is stirred in aqueous solution with the cation exchange agent sold under the trademark "Dowex 50" in its H-form for a short period of time to remove the sodium ions. The resulting aqueous solution is extracted with ether. The extracted aqueous solution is evaporated to dryness in a vacuum. The resulting 5-propyl deoxyuridine, i.e. 5-propyl-3-(2′-deoxyribosyl) uracil is obtained in a yield between 80% and 90%, i.e. in an amount between about 2.1 g. and about 2.4 g. It is soluble in water and in oils. The ultraviolet spectrum of an aqueous solution of said compound shows at a pH of 7.0 a minimum at 236 m$\mu$ and a maximum at 266 m$\mu$, which does not shift either in alkaline or in acidic medium, thus confirming the structure of 5-propyl deoxyuridine, i.e. that the ribose moiety is attached to the nitrogen atom in 3-position.

EXAMPLE 2

The procedure is the same as described in Example 1 whereby, however, 3.39 g. of mercury 5-ethyl uracil are used. Thereby, 2.0 g. of ethyl deoxyuridine, i.e. 5-ethyl-3-(2′-deoxyribosyl) uracil are obtained. The yield is 80% of the theoretical yield. Melting point: 154–157° C. The compound is soluble in water and in oils.

EXAMPLE 3

20.2 g. of dry trithylamine (0.2 mole) are added drop by drop to a solution of 15.4 g. of 5-propyl uracil (0.1 mole) and 21.7 g. of trimethyl silylchloride (0.2 mole) in 250 cc. of anhydrous benzene within 15 minutes while stirring. Care is taken that moisture is excluded during reaction. Stirring is continued for about 12 hours. Thereafter, the non-reacted 5-propyl uracil as well as the percipitated triethylamine hydrochloride are separated by filtration. The filtrate is evaporated to dryness in a vacuum. The residue is dissolved in 150 cc. of absolute toluene. A solution of 43 g. of 3,5-di-(p-chlorobenzoyl)-2-deoxy-D-ribofuranosyl chloride (0.1 mole) in 500 cc. of toluene is added followed by the addition of 31.8 g. of mercuro acetate. The mixture is stirred for 24 hours and is then filtered. The filtrate is extracted by shaking with a 30% aqueous potassium iodide solution and is then washed with water. The mercury-free toluene solution is dried over sodium sulfate and is concentrated by evaporation to a volume of about 100 cc. On standing, the acylated nucleoside crystallizes. 45 g. of the reaction product which melts between 140° C. and 165° C. are obtained. Yield: 82% of the theoretical yield.

The reaction product is a mixture of the $\alpha$-nucleoside and the $\beta$-nucleoside wherein the hydroxyl groups are protected by p-chloro benzoyl groups. On a single recrystallization from toluene, there are obtained 28 g. of a product which melts completely at 184° C. It consists to about 90% of the $\beta$-nucleoside. Further recrystallization from toluene increases the $\beta$-nucleoside content somewhat without, however, completely removing the $\alpha$-nucleoside. Pure $\beta$-nucleoside can be obtained, for instance, by repeated recrystallization from glacial acetic acid.

The combined toluene filtrates obtained on recrystallization are concentrated by evaporation in a vacuum to syrupy consistency. About 150 cc. of ether are added thereto. On allowing the mixture to stand in a refrigerator for a prolonged period of time, 14 g. of a mixture of the $\alpha$- and $\beta$-anomers are obtained. This mixture melts between 135° C. and 154° C. Recrystallization from ether yields the $\alpha$-anomer of the melting point 139–142° C. Examination of its thin layer chromatogram shows that this product still contains some $\beta$-anomer.

A solution of 3 cc. of a 2% sodium methanolate solution in 100 cc. of methanol is added to 5.47 g. of the substance melting at 184° C. as obtained by recrystallization of the above described reaction product from toluene. The mixture is heated under reflux for 90 minutes. On working up the de-acylation mixture as described in Example 1, 2.0 g. of 5-propyl deoxyuridine, i.e. 5-propyl-3-(2′-deoxyribosyl) uracil melting at 162–163° C. are obtained. The maximum of its ultraviolet spectrum at 266 m$\mu$ is not shifted in alkaline medium, nor in acid medium. This behavior indicates that the deoxyribosyl substituent is attached to the nitrogen atom in 3-position.

EXAMPLE 4

The procedure is the same as described in Example 3 whereby, however, 5-isopropyl uracil is used in place of 5-propyl uracil. The reaction product is a mixture of the $\alpha$-anomer and the $\beta$-monomer of 5-isopropyl-3-(2′-deoxyribosyl) uracil of the melting point of 162–170° C. The recrystallized $\beta$-nucleoside melts at about 182° C. while the $\alpha$-anomer which still contains $\beta$-anomer melts between 132° C. and 165° C. The compound is soluble in water and in oils.

On using, in place of 5-propyl uracil or 5-ethyl uracil, equivalent amounts of 5-isopropyl uracil. 5-tertiary butyl uracil, 5-n-hexyl uracil, 5-isoamyl uracil, 1-methyl-5- propyl uracil, 1-isopropyl-5-n-propyl uracil, 1-methyl-5-n-hexyl uracil, 1-ethyl-5-isobutyl uracil, 1,5-di-ethyl uracil, 1,5-di-n-propyl uracil, and others and otherwise proceeding in the same manner as described hereinabove in Examples 1 or 3, the corresponding 3-(2'-deoxyribosyl) uracil compounds are obtained.

In place of 3,5-di-(p-chloro benzoyl)-2-deoxyribofuranosyl chloride used in the examples as the one reactant, there may be used other reactive deoxyribose compounds in which the hydroxy groups are protected, such as, for instance, 3,5-dibenzoyl-2-deoxyribofuranosyl chloride, 3,5-dianisoyl-2-deoxyribofuranosyl chloride, 3,5-di-(p-toluoyl) - 2 - deoxyribofuranosyl chloride, 3,5-di-(p-nitrobenzoyl)-2-deoxyribofuranosyl chloride, and other p-(lower alkyl)phenyl, p-(lower alkoxy)phenyl, p-halogeno phenyl, and the like carboxy derivatives of deoxyribose.

The mercury salts of the 5-alkyl uracil compounds can be prepared as follows:

EXAMPLE 5

1.96 g. of 3-acetyl-5-propyl uracil prepared by boiling 5-propyl uracil in acetic acid anhydride in the presence of catalytic amounts of pyridine, is refluxed in 100 cc. of methanol while stirring. A solution of 3.19 g. of mercuric acetate is added thereto. Refluxing is continued for two hours. After cooling, the white precipitate of the mono-mercury salt of 5-propyl uracil is filtered off and dried at 80° C. 3.5 g. of said salt melting at 295° C. are obtained. The yield is almost quantitative.

The mono-mercury salts of other 5-lower alkyl uracils are obtained by following the procedure described hereinabove but using equimolecular amounts of the 3-acetyl compounds of the corresponding 5-lower alkyl uracils. The mono-mercury salt of 5-ethyl uracil, for instance, melts at 336–339° C. with decomposition.

UTILITY

As stated hereinabove, the new compounds exhibit, in contrast to the deoxyribosyl-free 5-alkyl uracil compounds, a surprisingly high antiviral activity. The preferred compounds are the 5-ethyl deoxyuridine and the 5-propyl deoxyuridine as obtained according to Examples 1 to 3. These compounds have proved to be of a satisfactory high antiviral activity when tested in tissue cultures of chicken embryo fibroblasts as well as in treating *Herpes keratitis* of rabbits.

For testing, the herpes infection was produced according to the method described by H. Kaufman, A. B. Nesburn, and E. D. Maloney in "Ach. Ophthalm.," vol. 67, page 583 (1962). Treatment was started only after clear manifestation of the infection. An 0.1% solution of the 5-ethyl deoxyuridine or 5-propyl deoxyuridine in Tyrode's solution was applied to the infected eye every hour during the day time and every two hours at night for 48 hours to 72 hours. 5-iodo deoxyuridine was used for comparison. The herpes lesions were made visible by staining the eyes with fluorescein sodium immediately before preparing the attached drawings. As is evident from said drawings, 5-ethyl deoxyuridine has a curative effect which sets in quite early and much earlier than that of the 5-iodo deoxyuridine and is much more persistent. The drawings also show that the initial curative effect of 5-iodo deoxyuridine disappears and dendritic herpes lesions are observed again, 21 days after the treatment has been discontinued. This is not the case when administering 5-ethyl deoxyuridine as is clearly evident from the drawings. 5-propyl deoxyuridine has a similar highly curative effect in contrast to 5-iodo deoxyuridine.

Other 5-alkyl deoxyuridines and 1,5-alkyl deoxyuridines according to the formula given hereinabove have a similar high antiviral activity.

The following table illustrates the results achieved with 5-ethyl-2'-deoxyuridine and shows the effect of said compound on the preparation of Vaccinia virus and of Aujeszky virus in tissue cultures of chicken embryo fibro blasts according to the Plaque test. It may be mentioned that both viruses belong to the type of DNA-viruses. 0.001% aqueous solutions of 5 - ethyl - 2' - deoxyuridine were added to the tissue cultures either:

(a) simultaneously with the inoculation of the cultures with the viruses or
(b) 24 hours before said inoculation or
(c) 24 hours before said inoculation and again simultaneously therewith. Under
(d) the control results are given.

The given numbers indicate the number of Plaque-forming units.

| Virus | a | b | c | d |
|---|---|---|---|---|
| Vaccinia | 24 | 81 | 1 | 66 |
| Aujeszky | 66 | 118 | 66 | 226 |

It is evident from said data that the number of Plaque-forming units is considerably reduced over those of the controls except when pretreating Vaccinia tissue cultures.

The compounds according to the present invention are preferably applied to the herpes-infected areas of the body such as the eye in the form of their aqueous solutions. 0.05% to 0.5% aqueous solutions or solutions in Tyrode's solution or the like and preferably 0.1% to 0.25% solutions have proved to be especially useful.

It is, of course, also possible to apply the active compounds according to the present invention to the infected areas of the body in the form of ointments in suitable pharmaceutical ointment bases which are compatible to the active compounds such as an anhydrous, buffered 0.15% to 0.2% ointment, or in the form of a pharmaceutical powder in mixture with a suitable, well compatible, pulverulent, inert diluent such as talc, colloidal silica, and others.

The ointments are applied to the infected areas of the body and especially to the eye every 2 hours to 5 hours. The ointment compositions given in Examples 7 to 9 are composed so that a satisfactory effect which sets in rapidly is achieved. It is, of course, understood that other ointment bases may also be used.

It is also possible to use sprays containing the active agent in the form of sprayable solutions or dispersions in aqueous or organic solvents which can be atomized by the action of suitable, pharmaceutically acceptable propellants. Such sprayable preparations may also be applied in the form of foams covering the herpes afflicted areas of the body.

The following examples serve to illustrate pharmaceutical preparations as they are used in therapy without, however, limiting the same thereto.

EXAMPLE 6

An aqueous solution to be drop-administered to the eye and for subconjunctival administration is composed of:

0.15 g. of 5-ethyl-2'-deoxyuridine and
0.85 g. of sodium chloride in
100 cc. of bidistilled water

EXAMPLE 7

0.15 g. of 5-propyl-2'-deoxyuridine are incorporated in, and thoroughly compounded with, an ointment base composed of:

10.0 g. of distilled water,
10.0 g. of wool fat (adepts lanae anhydrous), and
80.0 g. of white petrolatum (vaselinum alum)

EXAMPLE 8

0.2 g. of 5-isopropyl-2′-deoxyuridine are incorporated in, and thoroughly compounded with, an ointment base composed of:

15.0 g. of the liquid, colorless saturated fatty alcohol, mainly containing alcohols from octanol to dodecanol as sold by Deutsche Hydrierwerke A. G. under the trademark "Eutanol G" and of 85 g. white petrolatum

EXAMPLE 9

0.175 g. of 5-ethyl-2′-deoxyuridine are incorporated in, and thoroughly compounded with, an ointment base composed of:

20.0 g. of liquid petrolatum (paraffinum liquidum) and
80.0 g. of white petrolatum The compounds of the formula given hereinabove have proved to be of great therapeutic value in the treatment of virus infections, such as herpes simplex keratitis, herpes analis, herpes buccalis, herpes facialis, herpes genitalis, herpes labialis, herpes nasalis, herpes progenitalis, herpes recidivans, herpes recidivans menstrualis, and other DNA-virus infections.

An aqueous solution of 0.15 g. of 5-ethyl deoxyuridine in 10 cc. of isotonic sodium chloride solution was clinically used in the treatment of keratitis caused by herpes infection. During the daytime one drop each of said solution was dropped into the conjunctival sac of the infected eye per hour while at night one drop each of the solution every two hours was applied. Epithelization of the cornea was achieved in about 95% of the treated patients on administration of the drug for four to five days. No undesired side effects were observed.

Of course, many changes and variations in the starting materials and reactants, in the reaction conditions, temperature, and duration, in the solvents used, in the pharmaceutical compositions employed in therapy and their preparation, in the clinical use of such compositions, and the like may be made by those skilled in the art in accordance with the principles set forth herein and in the claims annexed hereto.

I claim:

1. A (2′-deoxyribosyl) uracil compound of the formula

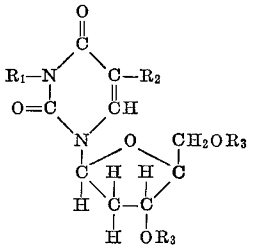

wherein:

$R_1$ indicates a member selected from the group consisting of hydrogen and alkyl with 1 to 3 carbon atoms,
$R_2$ indicates alkyl with 2 to 6 carbon atoms, and
$R_3$ indicates a member selected from the group consisting of hydrogen, lower alkanoyl, benzoyl, lower alkyl benzoyl, lower alkoxy benzoyl, nitro benzoyl, and chloro benzoyl.

2. The (2′-deoxyribosyl) compound according to claim 1, wherein $R_1$ in the formula is hydrogen, $R_2$ is ethyl, and $R_3$ is hydrogen, said compound being 5-ethyl-3-(2′-deoxyribosyl) uracil.

3. The (2′-deoxyribosyl) compound according to claim 1, wherein $R_1$ in the formula is hydrogen, $R_2$ is n-propyl, and $R_3$ is hydrogen, said compound being 5-n-propyl-3-(2′-deoxyribosyl) uracil.

4. The β-anomer of the (2′-deoxyribosyl) compound according to claim 1.

5. The β-anomer of the (2′-deoxyribosyl) compound according to claim 2.

6. The β-anomer of the (2′-deoxyribosyl) compound according to claim 3.

7. The diacylated (2′-deoxyribosyl) compound according to claim 1, wherein $R_1$ is hydrogen, $R_2$ is ethyl, and $R_3$ is p-chloro benzoyl, said compound being 5-ethyl-3-(di-p-chloro benzoyl-2′-deoxyribosyl) uracil.

8. The diacylated (2′-deoxyribosyl) compound according to claim 1, wherein $R_1$ is hydrogen, $R_2$ is n-propyl, and $R_3$ is p-chloro benzoyl, said compound being 5-n-propyl-3-(di-p-chloro benzoyl-2′-deoxyribosyl) uracil.

9. The (2′-deoxyribosyl) compound according to claim 1, wherein $R_1$ in the formula is hydrogen, $R_2$ is isopropyl, and $R_3$ is hydrogen, said compound being 5-isopropyl-3-(2′-deoxyribosyl) uracil.

References Cited

UNITED STATES PATENTS

| | | | |
|---|---|---|---|
| 2,885,396 | 5/1959 | Heidelberger | 260—211.5 |
| 3,183,226 | 5/1965 | Hunter | 260—211.5 |
| 3,208,997 | 9/1965 | Iwai et al. | 260—211.5 |
| 3,328,389 | 6/1967 | Shimizu et al. | 260—211.5 |
| 3,462,416 | 8/1969 | Hanze et al. | 260—211.5 |

LEWIS GOTTS, Primary Examiner
J. R. BROWN, Assistant Examiner

U.S. Cl. X.R.

424—180